2,957,889

BETA-ALKOXYCARBONYL COMPOUNDS AND PROCESS FOR MANUFACTURE OF SAME

Raymond I. Hoaglin and Donald G. Kubler, South Charleston, W. Va., assignors to Union Carbide Corporation, a corporation of New York No Drawing. Filed Aug. 1, 1956, Ser. No. 601,355

19 Claims. (Cl. 260—347.8)

This invention relates to novel polyfunctional carbonyl compounds and to a process of preparing the same. More particularly, this invention concerns the preparation of unsaturated beta-alkoxycarbonyl compounds by reacting an unsaturated aldehyde with an unsaturated ether in the presence of a suitable catalyst.

According to heretofore customary procedures it was known to prepare saturated beta-alkoxycarbonyl compounds by the addition of an alcohol to the carbon-to-carbon double bond of alpha, beta-unsaturated carbonyl compounds. Another alternative procedure involved the reaction of acetals with unsaturated ethers followed by hydrolysis of the resultant alkoxyacetals.

It is also known to produce various substituted meta-dioxanes and resinous acetals by the reaction of aldehydes and unsaturated ethers, with subsequent hydrolysis of certain of these complex acetals, to form alpha, beta-unsaturated aldehydes.

None of these foregoing procedues, however, disclose the preparation of unsaturated beta-alkoxyaldehydes and unsaturated beta-alkoxyketones.

According to the present invention a mixture is formed of at least one mole of an unsaturated aldehyde containing a carbon-to-carbon double bond between the carbon atoms adjacent the carbonyl group, no more than one mole of an 1-alkenyl alkyl ether, and a catalyst composed of an oxy compound of boron and a saturated organic carboxylic acid, such as oxalic acid, an ortho-hydroxy aromatic acid or an alpha-hydroxy carboxylic acid, under substantially anhydrous conditions, at a temperature in the range of 10° C. to 120° C. to form unsaturated beta-alkoxyaldehydes and unsaturated beta-alkoxyketones. The reaction is performed under essentially anhydrous conditions to prevent hydrolysis of the unsaturated ether.

The catalyst composition is prepared either in situ or separate from the reactants by admixture of the organic carboxylic acid with the oxyboron constituent, in which at least one of the boron valences is satisfied by linkage with an oxygen atom. This is accomplished by any of a variety of standard methods. In instances where both the boron compound and the organic acid are solids, for example, they may be mixed by grinding or added simultaneously to the unsaturated aldehyde reactant and dissolved therein.

It should be noted that the 1-alkenyl ether can be brought into contact with the catalyst composition only simultaneously with or subsequent to admixture of the catalyst with the aldehydic reactant.

Preferably, however, in a batchwise process, the catalyst is dissolved in the unsaturated aldehyde, with subsequent heating or cooling of the mixture to the desired temperature and adding the 1-alkenyl alkyl ether thereto while stirring the reaction mixture. After the reaction is complete the resultant mixture may be desirably neutralized with a suitable base such as for example, sodium bicarbonate, sodium carbonate, sodium hydroxide, sodium acetate, or the corresponding salts of other alkali metals or alkaline earth metals. The aqueous layer is then removed and the organic layer distilled to separate out and recover the unreacted unsaturated aldehyde reactant and the unsaturated beta-alkoxycarbonyl product. Where a continuous process is employed, the reactants and catalyst are usually introduced into the reaction chamber simultaneously.

The novel unsaturated beta-alkoxyaldehydes and unsaturated beta-alkoxyketones prepared in accordance with the practice of this invention correspond to the structure:

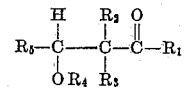

wherein each of $R_1$, $R_2$, and $R_3$ is hydrogen or an alkyl group containing one to four carbon atoms, $R_4$ is an alkyl group containing one to eight carbon atoms and $R_5$ is aryl, furyl, alkenyl, cycloalkenyl, alkadienyl, or cycloalkadienyl containing a carbon-to-carbon double bond between the carbon atoms adjacent the aliphatic oxygen-containing carbon atom said alkenyl containing two to ten carbon atoms, and each of said alkadienyl, cycloalkadienyl and cycloalkenyl containing five to ten carbon atoms.

The phrase "unsaturated aldehyde containing a carbon-to-carbon double bond between the carbon atoms adjacent the carbonyl group" as it is employed throughout this specification is intended to include compounds of the general formula:

wherein $R_5$ is as described above. It should be noted that the term aryl as used in this regard encompasses unsubstituted and halogen, alkyl and alkoxy substituted aromatic nuclei. Illustrative examples of these reactant unsaturated aldehydes are acrolein, 2-pentenal, 2-heptenal, 5-methyl-2-hexenal, 2-octenal, 2-nonenal, 2-decenal, 2,4-heptadienal, 2,6-heptadienal, 2,4-decadienal, methacrolein, 3-methyl-2-butenal, 3-methyl-2-heptenal, 1-formylcyclohexene, 1-formylcyclopentene, 3-phenyl-2-propenal, ortho-tolualdehyde, meta-tolualdehyde, para-tolualdehyde, ortho-ethylbenzaldehyde, meta-ethylbenzaldehyde, para-ethylbenzaldehyde, ortho-butylbenzaldehyde, meta-butylbenzaldehyde, para-butylbenzaldehyde, ortho - fluorobenzaldehyde, meta - fluorobenzaldehyde, para - fluorobenzaldehyde, ortho - chlorobenzaldehyde, meta - chlorobenzaldehyde, para - chlorobenzaldehyde, ortho - bromobenzaldehyde, meta - bromobenzaldehyde, para - bromobenzaldehyde, ortho - methoxybenzaldehyde, meta-methoxybenzaldehyde, para-methoxybenzaldehyde, ortho - ethoxybenzaldehyde, meta - ethoxybenzaldehyde, para - ethoxybenzaldehyde, alpha - naphthaldehyde, and beta-naphthaldehyde.

It should be further noted that term, 1-alkenyl alkyl ether, embraces those unsaturated ethers of the general formula:

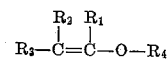

wherein $R_1$, $R_2$, $R_3$ and $R_4$ have the meaning ascribed to them hereinabove. Examples of these ethers are as follows: vinyl propyl ether, vinyl isopropyl ether, vinyl isobutyl ether, vinyl amyl ether, vinyl hexyl ether, vinyl heptyl ether, vinyl octyl ether, 1-propenyl methyl ether, 1-propenyl octyl ether, 1-butenyl butyl ether, 1-pentenyl methyl ether, 1-pentenyl octyl ether, 1-hexenyl methyl ether, 1-hexenyl butyl ether, 2-methyl-1-propenyl butyl ether, 2-methyl-1-butenyl methyl ether, 2-ethyl-1-pentenyl methyl ether, 2-butyl-1-hexenyl octyl ether, 2-propenyl butyl ether, 2-methoxy-1-hexene, 2-butoxy-1-hexene, and 2-butoxy-2-octene.

There is shown in the following table illustrative examples of reactant unsaturated aldehydes containing a carbon-to-carbon double bond between the carbon atoms adjacent the carbonyl group and 1-alkenyl ethers together with the final products resulting from a reaction of these two components in accordance with the practice of the present invention.

TABLE I

| Reactants | | Product |
|---|---|---|
| Aldehyde | Ether | |
| acrolein | 1-butenyl ethyl ether | 3-ethoxy-2-ethyl-4-pentenal. |
| crotonaldehyde | 1-butenyl isobutyl ether | 3-isobutoxy-2-ethyl-4-hexenal. |
| Do | 1-butenyl hexyl ether | 3-hexoxy-2-ethyl-4-hexenal. |
| Do | 1-butenyl octyl ether | 3-octoxy-2-ethyl-4-hexenal. |
| α-naphthaldehyde | vinyl butyl ether | 3-(α-naphthyl) 3-ethoxypropanol. |
| crotonaldehyde | 1-propenyl methyl ether | 3-methoxy-2-methyl-4-hexenal. |
| 2-hexenal | 1-hexenyl butyl ether | 3-butoxy-2-butyl-4-octenal. |
| 2-octenal | 2-butyl-1-hexenyl octyl ether | 2,2-dibutyl-3-octoxy-4-decenal. |
| crotonaldehyde | 2-propenyl methyl ether | 4-methoxy-5-hepten-2-one. |
| Do | 2-propenyl butyl ether | 4-butoxy-5-heptene-2-one. |
| 2-hexenal | 2-methoxy-1-hexene | 4-methoxy-2-dodecen-6-one. |
| benzaldehyde | 2-butoxy-2-octene | 1-butoxy-2-pentyl-1-phenyl-3-butanone. |
| 2-decenal | vinyl butyl ether | 3-butoxy-4-dodecenal. |
| Do | 1-butenyl ethyl ether | 3-ethoxy-2-ethyl-4-dodecenal. |
| 1-formylcyclohexene | vinyl ethyl ether | 3-(1-cyclohexenyl)-3-ethoxypropanal. |
| 1-formylcyclopentene | 1-hexenyl butyl ether | 3-butoxy-2-butyl-3-(1-cyclopentenyl)propanal. |
| 2,6-heptadienal | 1-butenyl hexyl ether | 2-ethyl-3-hexoxy-4,8-nonadienal. |
| para-methoxy-benzaldehyde | 2-ethyl-1-pentenyl methyl ether | 2-ethyl-3-methoxy-3-(para-methoxyphenyl)-2-propyl propanal. |
| ortho-chloro-benzaldehyde | vinyl butyl ether | 3-butoxy-3-(orthochlorophenyl)propanal. |
| meta-bromo-benzaldehyde | do | 3-butoxy-3-(meta-bromophenyl)propanal. |
| meta,tolualdehyde | 1-pentenyl ethyl ether | 3-ethoxy-2-propyl-3-(meta-tolyl)propanal. |

The catalyst which we employ herein is as described above, composed of an oxy compound of boron and a saturated organic carboxylic acid. The nature of this catalytic agent, however, is not precisely known. While it is possible that this two component catalyst remains a physical blend when, for example, in the reaction mix, it is also conceivable that it forms a chemical complex. Illustrative examples of the oxyboron component are pyroboric acid, metaboric acid, orthoboric acid, and the lower trialkyl esters of orthoboric acid, such as trimethyl borate, triethyl borate, tributyl borate and the like. Representative of the organic acids employed are oxalic acid, glycolic acid, lactic acid, malic acid, citric acid, tartronic acid, tartaric acid, mucic acid, salicylic acid, and mandelic acid.

The amount of catalyst to be employed can be varied considerably without adversely affecting the reaction. Optimum concentrations are from 0.02 percent to 2 percent of catalyst by weight of the reactant compounds. A less preferred limit permits use of 0.01 percent to 5 percent of catalyst by weight of the reactant aldehyde and ether. Below these limits the rate of reaction is considerably reduced. The upper limit for catalyst concentration is an economic rather than a chemical one.

The molar ratio of boric acid or ester to organic acid in the catalyst composition is not critical. However, a preferred relation is attained where approximately one mole of oxyboron constituent to one mole of organic acid is present in the reaction mix.

The operative temperature range for obtaining a satisfactory yield of the product aldehydes and ketones is between 10° C. and the boiling point of the particular reactant mixture at the working pressure, i.e. atmospheric pressure, that is not above 120° C. and preferably not more than 100° C. No advantage is seen in employing temperatures below 10° C. since the rate of the desired reaction is then slowed down considerably. The reaction is exothermic, thus the reaction mix may require cooling to stay within the desired temperature limits. The temperature can also be controlled by limiting the feed of the ether component to the reaction vessel.

It should be noted that while there must be at least one mole of aldehydic reactant to one mole equivalent of 1-alkenyl alkyl ether, any mole ratio wherein the aldehyde is present in excess of one is also operative. However, the reaction is preferably carried out with 2.5 to 5 moles of reactant aldehyde to one mole of ether. Residence times are not significant in the practice of the present invention, since the reactions are usually instantaneous.

The unsaturated beta-alkoxyaldehydes and beta-alkoxy-ketones of the present invention can be hydrogenated using Raney nickel catalyst at a temperature from 50° C. to 150° C. under a pressure of 500 p.s.i.g. (pounds per square inch gauge) to 3000 p.s.i.g. to form the corresponding saturated alcohols. These alcohols can be reacted with phthalic anhydride in the presence of sulfuric acid catalyst using a slight excess of the alcohol as a water entrainer. The temperature may be maintained at 180 to 200° C. until all of the water is removed. The resultant ester-alcohol mixture can be neutralized with sodium bicarbonate, washed with water and distilled to recover the corresponding phthalate esters, which are useful as plasticizers with solid polyvinyl chloride resins. Certain specific members of this class of novel compounds such as 4-ethoxy-5-heptene-2-one, 3-ethoxy-3-phenylpropanal, 3-ethoxy-2-ethyl-3-phenylpropanal, and 3-ethoxy-2-ethyl-3-(2-furyl)-propanal are also useful per se as the active odoriferant ingredient in perfumes and vaporizers employed for overcoming various unpleasant cooking odors and the like. Other specific compounds of this novel class, namely, 3-methoxy-4-hexenal, 3-ethoxy-4-hexenal, and 3-butoxy-4-hexenal readily undergo hydrolytic de-alcoholation in the presence of a 50 percent aqueous solution of acetic acid to form sorbaldehyde which by standard silver oxide oxidation can be convetred to sorbic acid, a well-known food preservative.

The following examples are further illustrative of the inventions.

*Example 1*

A boric acid-oxalic acid catalyst (1:1 complex) was prepared by dissolving 270 grams (3 moles) of anhydrous oxalic acid and 186 grams (3 moles) of ortho boric acid in 1100 ml. of water by stirring and heating to 50° C. The water was then removed by heating the solution under reduced pressure, never allowing the temperature of the solution to exceed 75° C. After evaporation, the residue was air dried overnight and then heated at 50° C. for 3 hours under 2 mm. pressure.

To 630 grams (9 moles) of crotonaldehyde in a one liter flask equipped with a stirrer, an addition funnel, a thermometer and a condenser, there was added 0.42 gram of a boric acid-oxalic acid catalyst. The mixture was heated to 40° C. and 216 grams (3 moles) of vinyl ethyl ether were added over a period of 26 minutes while stirring and maintaining the solution at 40° C. by external cooling. The red solution was allowed to stand 15 minutes and then was neutralized with 5 grams of sodium carbonate dissolved in 200 ml. of water. A change in color from red to pale yellow was observed. The aqueous layer was removed and the organic layer was distilled under reduced pressure. The product, after removing the excess crotonaldehyde at 90 mm., distilled from 54° C. to 65° C. at 10 mm. The yield was 195 grams (46%). 3-ethoxy-4-hexenal had the following physical properties: B.P. 64–65° C./10 mm. Hg; refractive index ($n_D^{20}$) 1.4318; specific gravity (sp. gr.) 20/15.6° C., 0.9073. Calculated (calcd.) for $C_8H_{14}O_2$: C. 67.57; H, 9.92; unsaturation, 14.06 meq./g. Found: C, 67.21; H, 10.08; unsaturation, 14.06 meq./g. (bromination, milliequivalent/grams).

Unless otherwise specified a boric acid-oxalic acid catalyst (1:1 complex) as prepared above is used throughout the balance of the examples.

Example 2

In a similar manner, 174 grams (3 moles) of vinyl methyl ether was added dropwise to 630 grams (9 moles) of crotonaldehyde containing 0.4 gram of a boric acid-oxalic acid catalyst. The reaction was conducted at 40° C. and the addition of the vinyl methyl ether lasted about 26 minutes. The catalyst was neutralized with aqueous sodium bicarbonate and after removal of the water layer, the organic material was distilled to give 134 grams (35 percent) of 3-methoxy-4-hexenal. B.P. 57–58° C./10 mm.; sp. gr. 20/15.6, 0.926; $n_D^{20}$ 1.4358; Calcd. for $C_7H_{12}O_2$: Unsaturation, 15.60 meq./g. Found: Unsaturation, 15.28 meq./g.

Example 3

Following the same procedure, 630 grams of crotonaldehyde (9 moles) and 300 grams (3 moles) of vinyl butyl ether were reacted at 40° C. in the presence of 0.47 gram of boric acid-oxalic acid catalyst. About 200 grams of 3-butoxy-4-hexenal were recovered (39 percent yield). B.P. 90–91° C./10 mm.; sp. gr. 20/15.6, 0.896; $n_D^{20}$ 1.4371. Calcd. for $C_{10}H_{18}O_2$: C, 70.55; H, 10.65. Found: C, 70.60; H, 10.80.

Example 4

A nine mole quantity (630 grams) of crotonaldehyde, and three moles (300 grams) of 1-butenyl ethyl ether were reacted at 40° C. employing 0.47 gram of boric acid-oxalic acid catalyst. A yield of 61 percent of 3-ethoxy-2-ethyl-4-hexenal was obtained (314 grams). B.P. 82–83° C./10 mm.; sp. gr. 20/15.6, 0.895; $n_D^{20}$ 1.4375. Calcid. for $C_{10}H_{18}D_2$: C, 70.55; H, 10.65. Found: C, 70.60; H, 10.80.

Example 5

The reaction of 630 grams of crotonaldehyde (9 moles) and 258 grams (3 moles) of isobutenyl methyl ether was conducted as previously described at 80° C. in the presence of 0.44 gram of boric acid-oxalic acid catalyst. The product, 2,2-dimethyl-3-methoxy-4-hexenal, distilled at 67–68° C./10 mm. The yield was 153 grams (33 percent). Sp. gr. 20/15.6, 0.905; $n_D^{20}$ 1.4387. Calcd. for $C_9H_{16}O_2$: C, 70.55; H, 10.65. Found: C, 70.70; H, 11.20.

Example 6

A 7.4 mole quantity (728 grams) of 2-hexenal and 2.5 moles (248 grams) of 1-butenyl ethyl ether was reacted at 80° C. under the conditions previously described in the presence of 0.97 gram of boric acid-oxalic acid catalyst. The recovery of 3-ethoxy-2-ethyl-4-octenal amounted to 67 percent (329 grams). B.P. 107–108° C./10 mm.; sp. gr. 20/15.6, 0.882; $n_D^{20}$ 1.4450. Calcd. for $C_{12}H_{22}O_2$: C, 72.68; H, 11.18. Found: C, 72.89; H, 11.43.

Example 7

Benzaldehyde, amounting to 7.1 moles (756 grams) and 2.4 moles (172 grams) of vinyl ethyl ether were reacted at 40° C. in the presence of 0.47 gram of boric acid-oxalic acid catalyst, following the same general procedure. The 3-ethoxy-3-phenylpropanal was obtained in 32 percent yield. B.P. 116–118° C./10 mm.; sp. gr. 20/15.6, 1.024; $n_D^{20}$ 1.5180. Calcd. for $C_{11}H_{14}O_2$: C, 74.13; H, 7.92. Found: C, 74.70; H, 8.16.

Example 8

In a similar manner 9 moles of benzaldehyde (954 grams) and 13 moles of 1-butenyl ethyl ether (300 grams) were reacted at 40° C. in the presence of 0.63 gram of boric acid-oxalic acid catalyst. The 3-ethoxy-2-ethyl-3-phenylpropanal was obtained in 78 percent yield (428 grams). B.P. 127–128° C./10 mm.; sp. gr. 20/15.6, 0.997; $n_D^{20}$ 1.5132. Calcd. for $C_{13}H_{18}O_2$: C, 75.69; H, 8.79. Found: C, 75.90; H, 8.60.

Example 9

A 19.9 mole (1398 grams) quantity of crotonaldehyde and 6.6 moles of isopropenyl ethyl ether were reacted at 100° C. in the presence of 0.99 gram of boric acid-oxalic acid catalyst at 100° C. A 29 percent yield of 4-ethoxy-5-heptene-2-one was obtained. B.P. 72–75° C./10 mm.; sp. gr. 20/15.6, 0.893; $n_D^{20}$ 1.4332. Calcd. for $C_9H_{16}O_2$: C, 69.19; H, 10.32. Found: C, 69.07; H, 10.58.

Example 10

A reaction of 9 moles (864 grams) of 2,4-hexadienal and 3 moles (300 grams) of 1-butenyl ethyl ether was conducted at 40° C. in the presence of 0.58 gram of boric acid-oxalic acid catalyst. There was obtained 291 grams (49 percent) of 3-ethoxy-2-ethyl-4,6-octadienal. B.P. 112°/5 mm.; sp. gr. 20/15.6, 0.909; $n_D^{20}$ 1.4815. Calcd. for $C_{12}H_{20}O_2$: C, 73.42; H, 10.27. Found: C, 73.30; H, 10.50.

Example 11

Into a 2-liter flask there were placed 576 grams (6 moles) of furfural and 0.78 gram of boric acid-oxalic acid and the mixture was heated to 40° C.; 200 grams (2 moles) of 1-butenyl ethyl ether was added dropwise with stirring and cooling over a period of 18 minutes, while maintaining the temperature at 40° C. About fifteen minutes later the mixture was neutralized with a 10 percent solution of sodium bicarbonate. The aqueous layer was removed and the organic layer was distilled through a 32 x 450-mm. protruded metal-packed column. A 24 percent yield (94 grams) of 3-ethoxy-2-ethyl-3-furylpropanal was obtained. B.P. 83° C./1 mm.; $n_D^{20}$ 1.4640; sp. gr. 20/15.6, 1.0225. Calcd. for $C_{11}H_{16}O_3$: C, 67.32; H, 8.22. Found: C, 66.56; H, 8.01.

Example 12

A mixture of 420 grams (6 moles) of crotonaldehyde and 0.56 of a boric acid-tartaric acid catalyst (prepared by the same procedure used in making the boric acid-oxalic acid catalyst) was placed in a one-liter kettle. The mixture was heated to 40° C. and 144 grams (2 moles) of vinyl ethyl ether were added over a period of 17 minutes while stirring and maintaining the temperature at 40° C. by external cooling. After 15 minutes the mixture was neutralized with a 10 percent sodium bicarbonate solution. The aqueous layer was mechanically separated and the organic layer was distilled under reduced pressure giving 100 grams (35 percent) of 3-ethoxy-4-hexenal, described in Example 1.

Example 13

A boric acid-oxalic acid catalyst was prepared by grinding an equimolecular mixture of boric acid and oxalic acid dihydrate. An 0.56 gram amount of this catalyst was added to 6 moles (420 grams) of crotonaldehyde and reacted with 2 moles (144 grams) of vinyl ethyl ether under the same conditions as in Example 12. A yield of 84 grams (29.6 percent) of 3-ethoxy-4-hexenal was obtained.

Example 14

A boric acid-salicylic acid catalyst was prepared according to a similar procedure as in Example 13, and 0.56 gram was added to 6 moles (420 grams) of crotonaldehyde. The mixture was heated to 80° C. and 144 grams (2 moles) of vinyl ethyl ether was added over a period of 47 minutes while by means of slight external cooling the temperature was kept constant. A recovery of 93 grams (32.7 percent) of 3-ethoxy-4-hexenal was achieved following the prescribed procedure.

*Example 15*

To 420 grams (6 moles) of crotonaldehyde, there was added 0.56 gram of a boric acid-glycolic acid catalyst (prepared by grinding an equimolecular mixture of boric acid and glycolic acid). The mixture was heated to 80° C. and 144 grams (2 moles) of vinyl ethyl ether was added over a period of an hour while maintaining the temperature at 80° C. by slight external cooling. After processing, according to the usual procedure 13 grams (4.6 percent) of 3-ethoxy-4-hexenal was obtained.

*Example 16*

A mixture of 4 grams of tributylborate and 0.16 gram of anhydrous oxalic acid were added to 420 grams (6 moles) of crotonaldehyde, and the resultant mixture was heated to 80° C. While maintaining the temperature at 80° C. by external cooling, 2 moles (144 grams) of vinyl ethyl ether was added. A yield of 119 grams (41.9 percent) of 3-ethoxy-4-hexenal was obtained.

We claim:
1. Unsaturated beta-alkoxycarbonyl compounds of the following formula:

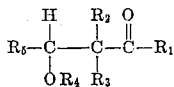

wherein each of $R_1$, $R_2$ and $R_3$ is a member selected from the group consisting of hydrogen and alkyl, said alkyl containing one to four carbon atoms; $R_4$ is an alkyl containing one to eight carbon atoms and $R_5$ is an unsaturated member selected from the group consisting of phenyl, furyl, alkenyl, and alkadienyl groups and containing a carbon-to-carbon double bond between the carbon atoms adjacent the aliphatic oxygen-containing carbon, said alkenyl containing two to ten carbon atoms and said alkadienyl containing five to ten carbon atoms.
2. 3-methoxy-4-hexenal.
3. 3-ethoxy-4-hexenal.
4. 3-butoxy-4-hexenal.
5. 3-ethoxy-2-ethyl-4-hexenal.
6. 3-methoxy-2,2-dimethyl-4-hexenal.
7. 4-ethoxy-5-heptene-2-one.
8. 3-ethoxy-2-ethyl-4-octenal.
9. 3-ethoxy-2-ethyl-4,6-octadienal.
10. 3-ethoxy-3-phenylpropanal.
11. 3-ethoxy-2-ethyl-3-phenylpropanal.
12. 3-ethoxy-2-ethyl-3-(2-furyl) propanal.
13. A method of preparing unsaturated beta-alkoxycarbonyl compounds of the following formula:

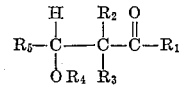

wherein each of $R_1$, $R_2$ and $R_3$ is a member selected from the group consisting of hydrogen and alkyl groups containing from 1 to 4 carbon atoms; $R_4$ is an alkyl group containing from 1 to 8 carbon atoms and $R_5$ is an unsaturated member selected from the group consisting of phenyl, furyl, alkenyl groups containing from 2 to 10 carbon atoms, and alkadienyl groups containing from 5 to 10 carbon atoms, said alkenyl and alkadienyl groups containing a carbon-to-carbon double bond between the carbon atoms adjacent the aliphatic oxygen-containing carbon; which comprises forming a mixture of at least one mole of an unsaturated aldehyde containing a carbon-to-carbon double bond between the carbon atoms adjacent the carbonyl group, and having the formula:

$$R_5—CHO$$

and no more than one mole of a 1-alkenyl alkyl ether having the formula:

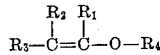

wherein $R_1$–$R_5$ are as previously indicated; and a catalyst consisting of a compound which is a member selected from the group consisting of pyroboric acid, metaboric acid, orthoboric acid and lower trialkyl esters of orthoboric acid together with a member selected from the group consisting of oxalic acid, salicylic acid, tartaric acid, and glycolic acid, under substantially anhydrous conditions, at a temperature in the range of 10° C. to 120° C.

14. A method of preparing unsaturated beta-alkoxycarbonyl compounds of the following formula:

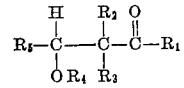

wherein each of $R_1$, $R_2$ and $R_3$ is a member selected from the group consisting of hydrogen and alkyl groups containing from 1 to 4 carbon atoms; $R_4$ is an alkyl group containing from 1 to 8 carbon atoms and $R_5$ is an unsaturated member selected from the group consisting of phenyl, furyl, alkenyl groups containing from 2 to 10 carbon atoms, and alkadienyl groups containing from 5 to 10 carbon atoms, said alkenyl and alkadienyl groups containing a carbon-to-carbon double bond between the carbon atoms adjacent the aliphatic oxygen-containing carbon; which comprises forming a mixture of 2.5 to 5 moles of an unsaturated aldehyde containing a carbon-to-carbon double bond between the carbon atoms adjacent the carbonyl group, and having the formula:

$$R_5—CHO$$

and no more than one mole of a 1-alkenyl alkyl ether having the formula:

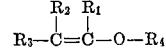

wherein $R_1$–$R_5$ are as previously indicated; and a catalyst consisting of a compound which is a member selected from the group consisting of pyroboric acid, metaboric acid, orthoboric acid and lower trialkyl esters of orthoboric acid together with an equal molar ratio of a member selected from the group consisting of oxalic acid, salicylic acid, tartaric acid, and glycolic acid, under substantially anhydrous conditions, at a temperature in the range of 10° C. to 120° C.

15. A method of preparing unsaturated beta-alkoxycarbonyl compounds as claimed in claim 13 wherein the catalyst is boric acid and tartaric acid.

16. A method of preparing unsaturated beta-alkoxycarbonyl compounds as claimed in claim 13 wherein the catalyst is boric acid and oxalic acid.

17. A method of preparing unsaturated beta-alkoxycarbonyl compounds as claimed in claim 13 wherein the catalyst is boric acid and salicylic acid.

18. A method of preparing unsaturated beta-alkoxycarbonyl compounds as claimed in claim 13 wherein the catalyst is boric acid and glycolic acid.

19. A method of preparing unsaturated beta-alkoxycarbonyl compounds as claimed in claim 13 wherein the catalyst is tributylborate and oxalic acid.

References Cited in the file of this patent
UNITED STATES PATENTS

| | | |
|---|---|---|
| 2,487,525 | Copenhaver | Nov. 8, 1949 |
| 2,561,254 | Whetstone | July 17, 1951 |

OTHER REFERENCES

Hoaglin: J.A.C.S., vol. 71, pp. 3468–72 (1949).
Pauly: Berichte, vol. 33, pp. 500–504.
Noller: Chemistry of Organic Compounds (Second Edition, 1957), pages 196 and 203.

UNITED STATES PATENT OFFICE

CERTIFICATION OF CORRECTION

Patent No. 2,957,889                                              October 25, 1960

Raymond I. Hoaglin et al.

It is hereby certified that error appears in the above numbered patent requiring correction and that the said Letters Patent should read as corrected below.

Column 2, line 56, after "that" insert -- the --; column 4, lines 47 and 48, for "convetred" read -- converted --; column 5, line 24, for "15,28" read -- 15.28 --; line 43, for "Calcid. for $C_{10}H_{18}D_2$" read -- Calcd. for $C_{10}H_{18}O_2$ --.

Signed and sealed this 23rd day of May 1961.

(SEAL)
Attest:

ERNEST W. SWIDER                                          DAVID L. LADD
Attesting Officer                                              Commissioner of Patents